US008214090B2

(12) United States Patent
Villaume et al.

(10) Patent No.: US 8,214,090 B2
(45) Date of Patent: Jul. 3, 2012

(54) METHOD AND DEVICE FOR GENERATING A YAW SPEED ORDER FOR AN AIRCRAFT DURING A TAXIING

(75) Inventors: Fabrice Villaume, Seysses (FR); Pierre Scacchi, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 805 days.

(21) Appl. No.: 12/330,372

(22) Filed: Dec. 8, 2008

(65) Prior Publication Data

US 2009/0150010 A1 Jun. 11, 2009

(30) Foreign Application Priority Data

Dec. 11, 2007 (FR) ...................................... 07 08599

(51) Int. Cl.
*G05D 1/00* (2006.01)
(52) U.S. Cl. ................ 701/13; 701/15; 701/16; 701/19; 303/126; 244/111
(58) Field of Classification Search ................ 701/3, 15, 701/16, 19; 303/126; 244/111
See application file for complete search history.

(56) References Cited

U.S. PATENT DOCUMENTS

| 4,482,961 | A | * | 11/1984 | Kilner et al. | 701/16 |
|---|---|---|---|---|---|
| 4,837,696 | A | * | 6/1989 | Lebrun et al. | 701/15 |
| 5,400,864 | A | * | 3/1995 | Winner et al. | 180/169 |
| 5,654,890 | A | * | 8/1997 | Nicosia et al. | 701/16 |
| 5,867,804 | A | * | 2/1999 | Pilley et al. | 701/120 |
| 5,913,376 | A | * | 6/1999 | Takei | 180/168 |
| 5,978,715 | A | * | 11/1999 | Briffe et al. | 701/11 |
| 6,144,915 | A | * | 11/2000 | Shiomi et al. | 701/120 |
| 6,542,086 | B2 | * | 4/2003 | Baumgartner et al. | 340/958 |
| 6,577,952 | B2 | * | 6/2003 | Geier et al. | 701/446 |
| 6,914,542 | B2 | * | 7/2005 | Hutton | 340/958 |
| 6,928,363 | B2 | * | 8/2005 | Sankrithi | 701/120 |
| 6,991,304 | B2 | * | 1/2006 | Villaume | 303/126 |
| 7,014,146 | B2 | * | 3/2006 | Villaume et al. | 244/111 |
| 7,088,310 | B2 | * | 8/2006 | Sanford | 345/7 |
| 7,305,285 | B2 | * | 12/2007 | Villaume et al. | 701/3 |
| 7,340,327 | B2 | * | 3/2008 | Villaume et al. | 701/15 |
| 7,702,453 | B2 | * | 4/2010 | Hutton | 701/120 |
| 7,731,302 | B2 | * | 6/2010 | Tandy et al. | 303/7 |
| 7,772,992 | B2 | * | 8/2010 | Fetzmann et al. | 340/961 |
| 7,798,263 | B2 | * | 9/2010 | Tandy et al. | 180/14.6 |

(Continued)

FOREIGN PATENT DOCUMENTS

FR    2 895 726    7/2007

OTHER PUBLICATIONS

Preliminary Search Report dated Jun. 13, 2008 w/ English translation.

*Primary Examiner* — Thomas G. Black
*Assistant Examiner* — Wae Louie
(74) *Attorney, Agent, or Firm* — Dickinson Wright PLLC

(57) ABSTRACT

Disclosed is a method and device for generating a yaw rate command for an aircraft along a ground trajectory. The yaw rate command is generated by determining a current curvature, lateral deviation and angular deviation of the ground trajectory. A yaw rate calculator then calculates a yaw rate and generates the yaw rate command based on the determined current curvature, lateral deviation and angular deviation.

10 Claims, 5 Drawing Sheets

U.S. PATENT DOCUMENTS

| | | | |
|---|---|---|---|
| 7,826,666 B2 * | 11/2010 | Hamza et al. | 382/218 |
| 7,835,829 B2 * | 11/2010 | Villaume et al. | 701/15 |
| 7,853,369 B2 * | 12/2010 | Villaume | 701/4 |
| 7,908,043 B2 * | 3/2011 | Villaume et al. | 701/4 |
| 7,974,773 B1 * | 7/2011 | Krenz et al. | 701/120 |
| 8,016,366 B2 * | 9/2011 | Rudd, III | 303/147 |
| 8,024,078 B2 * | 9/2011 | Coulmeau et al. | 701/3 |
| 8,026,833 B2 * | 9/2011 | Villaume et al. | 340/961 |
| 2004/0186651 A1 | 9/2004 | Tange | |
| 2007/0208466 A1 | 9/2007 | Meunier | |
| 2009/0150010 A1 * | 6/2009 | Villaume et al. | 701/3 |
| 2011/0040431 A1 * | 2/2011 | Griffith et al. | 701/15 |

* cited by examiner

METHOD AND DEVICE FOR GENERATING A YAW SPEED ORDER FOR AN AIRCRAFT DURING A TAXIING

FIELD OF THE INVENTION

The present invention relates to a method and a device for generating a yaw rate command for an aircraft rolling on the ground along a trajectory.

BACKGROUND OF THE INVENTION

The present invention therefore applies to the rolling of an aircraft on the ground, in particular an airplane, civil or military, for transporting passengers or merchandise (freight), or else a drone. It relates more particularly to an automatic lateral guidance making it possible to slave, in relation to the lateral axis and along a given trajectory, an aircraft rolling on the ground.

Within the framework of the present invention, the following meanings are implied:
  "rolling on the ground" implies any type of possible rolling of an aircraft, such as rolling on a landing runway in the course of the landing and takeoff phases, or rolling on trafficways or on maneuvering areas, in particular; and
  "automatic lateral guidance" implies the action of a system forming an integral part of the aircraft and capable of ensuring, partially or totally, that is to say without aid or with the partial aid of a (human) operator, the driving of an aircraft on the ground in relation to the lateral axis.

Currently, the pilot controls the lateral movements of the aircraft on the ground with the aid of manual piloting facilities (for example a steering wheel allowing the orientation of the wheel of the front landing gear, a lever for controlling the thrust of the engines, brake pedals, a direction rudder bar), along a ground trajectory. These facilities make it possible to control actuators of the aircraft capable of influencing the lateral movements of the aircraft, in particular by way of the orientation of the wheel of the front landing gear (and optionally of the orientation of the rear gear) and of the rudder of the fin, as well as of the asymmetric use of the engines and brakes.

The term "ground trajectory" designates the pathway followed by the aircraft on an airport domain such as an airport or aerodrome, including in particular the takeoff and landing runways, the trafficways or taxiways, the turn-around areas, the waiting zones, the stop bars, the stopping positions (stand), the maneuvering areas, and the parking areas.

The ground trajectory is generally provided to the pilot by an air traffic controller or ground controller, for example by way of radiocommunication means or some other standard means such as a digital data transmission link, but it can also, in certain cases, be chosen freely by the pilot.

The trajectory is defined in the form of a succession of elements of the airport domain, and indicates a path making it possible to attain, from one point or region of the airport domain, another point or region of this domain.

Any portion of the domain, whether or not designated by a name, and identified as a distinct and delimited part of the domain, is called an element of the airport domain. An element may optionally overlap one or more others. The takeoff and landing runways, the trafficways or taxiways, the turn-around areas, the waiting zones, the stop bars, the stopping positions (stand), the maneuvering areas and the parking areas are in particular designated as elements.

Knowing the ground trajectory to be followed, the pilot acts on the piloting facilities, so as to control the movements of the aircraft on the ground (the longitudinal speed and the lateral displacements of the aircraft). He does so also in order to follow the trajectory in such a way that all the parts of the aircraft in contact with the ground (the wheels of the front and rear gear) remain permanently on the pavement designed for aircraft rolling. For most airports accommodating civil or military transport airplanes, the term "ground" implies the parts covered with tarmac and designed for this purpose. The pilot's objective is therefore to follow a trajectory so that none of the parts of the aircraft in contact with the ground lies, at a given moment, on a portion of the airport domain that is not designed for the rolling of the aircraft, in particular portions covered with grass, earth or sand, or portions designed solely for the rolling of lighter vehicles (cars, trucks).

The pilot may optionally be helped by the aid of a map of the airport (in paper or computer format) to carry out the manual guidance of the aircraft along the trajectory, while monitoring the exterior environment thereof.

Manual piloting of an aircraft on the ground nevertheless constitutes a significant workload for the pilot. The latter must in fact follow the scheduled trajectory by controlling the rotation of the aircraft in relation to the yaw axis (with the aid of the steering wheel and rudder bar), while taking care not to depart from the pavement designed for the rolling of the aircraft, and while simultaneously monitoring the exterior environment, and in particular:
  the movements of the other vehicles traveling around the airport domain, in particular aircraft currently rolling on the ground, taking off or landing, cars, trucks, etc.; and
  the obstacles present around the aircraft and liable to cause a collision with the latter, in particular buildings, gangways, antennas, indication and signaling panels, and other vehicles on the ground, stationary or otherwise (aircraft, cars, trucks, mobile gangways).

This significant workload may, consequently, influence the pilot's vigilance, and lead, in particular, to the following of an unscheduled trajectory, departures from the pavement designed for the rolling of the aircraft, and collisions with other vehicles or obstacles that may lead to significant damage to equipment and humans.

When conditions exist that are detrimental to the visibility (for the pilot) of the exterior environment, in particular at night or during unfavorable meteorological conditions (in particular fog, snow, rain, storms, etc.), the pilot may be dependent on exterior aid for piloting the aircraft, for example the aid of a vehicle to be followed which makes it possible to guide the aircraft visually along the trajectory by traveling ahead of it at low speed. Dependence on exterior aid such as this is often penalizing for airlines, since the low-speed movement of the aircraft may induce delays in the scheduled timetables. In certain cases, in particular in the event of extreme meteorological conditions, the airport traffic may even remain totally paralyzed if the exterior aid turns out to be ineffective, thus leading to delays and significant costs for the airlines.

Additionally, the driving of aircraft of significant length can be difficult to achieve, in particular during turns, because of the significant wheelbase between the front and rear gear. Under these conditions, it is, in fact, more difficult to drive the aircraft so that all the parts in contact with the ground remain on the pavement designed for the rolling of the aircraft, thereby requiring the use of additional pilot aids, for example the employing of exterior cameras allowing the pilot to verify that the wheels of the front gear do not depart from the pavement (the case of transport airplanes of the A 380 and A340-600 types).

Furthermore, the manual guidance of the aircraft does not offer any guarantee in terms of accuracy of trajectory tracking. In particular, it does not make it possible to quantify the gaps between the wheels of the front and rear gear and the edges of the pavement, or the gaps between a given point of the aircraft and the paint on the ground or the trajectory to be followed, or any other reference that may serve as support for lateral guidance.

SUMMARY OF THE INVENTION

The object of the present invention is to remedy the aforesaid drawbacks. It relates to a method making it possible to generate a yaw rate command for an aircraft, in particular a transport airplane, rolling on the ground along a trajectory.

For this purpose, according to the invention, said method is noteworthy in that the following successive steps are carried out in a repetitive and automatic manner:
a) the current position, the current heading, the current lateral speed, and the current longitudinal speed of said aircraft are measured;
b) a current curvature at a current target point of the trajectory is determined on the basis of said trajectory and of said measured current position;
c) a current lateral deviation is determined on the basis of said trajectory and of said measured current position;
d) a current angular deviation is determined on the basis of said trajectory and of said measured current heading; and
e) a yaw rate which represents said yaw rate command allowing the aircraft to follow said trajectory is calculated on the basis of said measured current lateral and longitudinal speeds, as well as on the basis of said current curvature, of said current lateral deviation and of said current angular deviation.

Thus, by virtue of the invention, a yaw rate command (or lateral guidance command) is obtained which enables the aircraft to be made to follow said trajectory laterally, while said aircraft is rolling on the ground, in particular on an airport domain.

As specified below, by virtue of the invention, on the basis of a predefined trajectory, a yaw rate command is obtained which is a global command so that, applied to the aircraft as a whole, it makes it possible to exert, by means of an appropriate system specified below, an aircraft rotation moment in relation to the vertical axis, so as to be able to slave a point of said aircraft (for example the wheel of the front gear, the center of gravity of the aircraft, or the mid-point of the main points) along the trajectory. Stated otherwise, it makes it possible to keep the ground projection of this point on said trajectory, to within an error margin.

In a particular embodiment:
a current element of said trajectory comprising a series of successive elements is determined on the basis of said trajectory and of said measured current position;
a current target point is determined on this current element, by taking account of a control point of the aircraft and of said current position; and
the curvature of said current element at said current target point is determined so as to obtain said current curvature.

Furthermore, in an advantageous manner:
said current lateral deviation is determined as the distance between a control point of the aircraft (that one seeks to slave to the trajectory) and a current target point of the trajectory; and/or
said current angular deviation is determined as the angular deviation between the current heading of the aircraft and the tangent to the trajectory at the level of a current target point.

Additionally, in a (first) simplified embodiment, said yaw rate command rc1 is calculated with the aid of the following expression:

$$rc1=(tg\beta 1 \cdot Vx - Vy)/LRA$$

in which:
Vx is the measured current longitudinal speed of the aircraft;
Vy is the measured current lateral speed of the aircraft;
LRA is a parameter illustrating the longitudinal wheelbase of the aircraft; and
$\beta 1$ is a parameter which depends on the current curvature, on the current lateral deviation, and on the current angular deviation.

Furthermore, in a (second) preferred embodiment:
the current yaw rate of the aircraft is measured;
a predicted curvature is determined on the basis of said trajectory and of said measured current position of the aircraft; and
said yaw rate command rc2 is calculated with the aid of the following expression:

$$rc2=(tg\beta 2 \cdot Vx - Vy)/LRA$$

in which:
Vx is the measured current longitudinal speed of the aircraft;
Vy is the measured current lateral speed of the aircraft;
LRA is a parameter illustrating the longitudinal wheelbase of the aircraft; and
$\beta 2$ is a parameter which depends on the current curvature, the current lateral deviation, the current angular deviation, the current yaw rate and the predicted curvature.

In this preferred embodiment, said predicted curvature corresponds to the curvature of the trajectory which is scheduled at a predetermined distance from (in front of) the current position of the aircraft.

The present invention also relates to a procedure for the automatic lateral guidance of an aircraft rolling on the ground.

According to the invention, this procedure is noteworthy in that the series of following successive operations is carried out in an automatic and repetitive manner:
A/ a yaw rate command is generated by implementing the aforesaid method;
B/ setpoints able to be applied to control means which act on the yaw motion of the aircraft are calculated, said setpoints being such that, applied to said control means, the latter pilot the aircraft laterally according to said yaw rate command; and
C/ the setpoints thus calculated are applied to said control means.

Such a procedure for the automatic guidance of an aircraft in relation to a lateral axis, along a predefined trajectory, is advantageous, in particular for the following reasons:
it makes it possible to reduce the pilot's workload in the course of an aircraft movement phase, by handling its lateral guidance. Thus, the pilot can concentrate on other tasks, in particular the speed of the aircraft, monitoring of the exterior environment (movement of other vehicles, surrounding obstacles), communication with the air/ground traffic control, etc.;
it makes it possible to guarantee the position of the aircraft with respect to the axis of a runway, trafficway or any other element of the airport domain, through which said trajectory passes. It thus makes it possible:
to guarantee the guidance of the aircraft, whose relative length with respect to the dimensions of the trafficways may pose difficulties (such as the risk of wheels departing from the pavement), without requiring any additional device intended to aid the pilot (such as an exterior camera for example); and to authorize the circulation of the aircraft under visibility conditions which make the action of guidance difficult, doing so without using any exterior aid such as a vehicle to be followed for example.

The present invention also relates to a device for generating a yaw rate command for an aircraft, in particular a transport airplane, rolling on the ground along a trajectory.

According to the invention, this device is noteworthy in that it comprises:

means for receiving said trajectory;

means for measuring the current position, the current heading, the current lateral speed, and the current longitudinal speed of said aircraft;

means for determining, on the basis of said trajectory and of said measured current position, a current curvature at a current target point of the trajectory;

means for determining, on the basis of said trajectory and of said measured current position, a current lateral deviation;

means for determining, on the basis of said trajectory and of said measured current heading, a current angular deviation; and means for calculating, on the basis of said measured current lateral and longitudinal speeds, as well as on the basis of said current curvature, of said current lateral deviation and of said current angular deviation, a yaw rate which represents said yaw rate command allowing the aircraft to follow said trajectory.

This device can in particular form part of a system for the (automatic) lateral guidance of an aircraft rolling on the ground, which comprises, according to the invention:

in addition to said device which is intended to generate a yaw rate command;

control means which act on the yaw motion of the aircraft;

means for calculating setpoints able to be applied to said control means, said setpoints being such that, applied to said control means, the latter pilot the aircraft laterally according to said yaw rate command (generated by said device); and means for applying the setpoints thus calculated to said control means.

The present invention also relates to an aircraft, in particular a transport airplane, civil or military, which comprises a device and/or a system, such as those aforesaid.

BRIEF DESCRIPTION OF THE DRAWINGS

The figures of the appended drawing will elucidate the manner in which the invention may be embodied. In these figures, identical references designate similar elements.

DETAILED DESCRIPTION OF THE INVENTION

Figure 1:
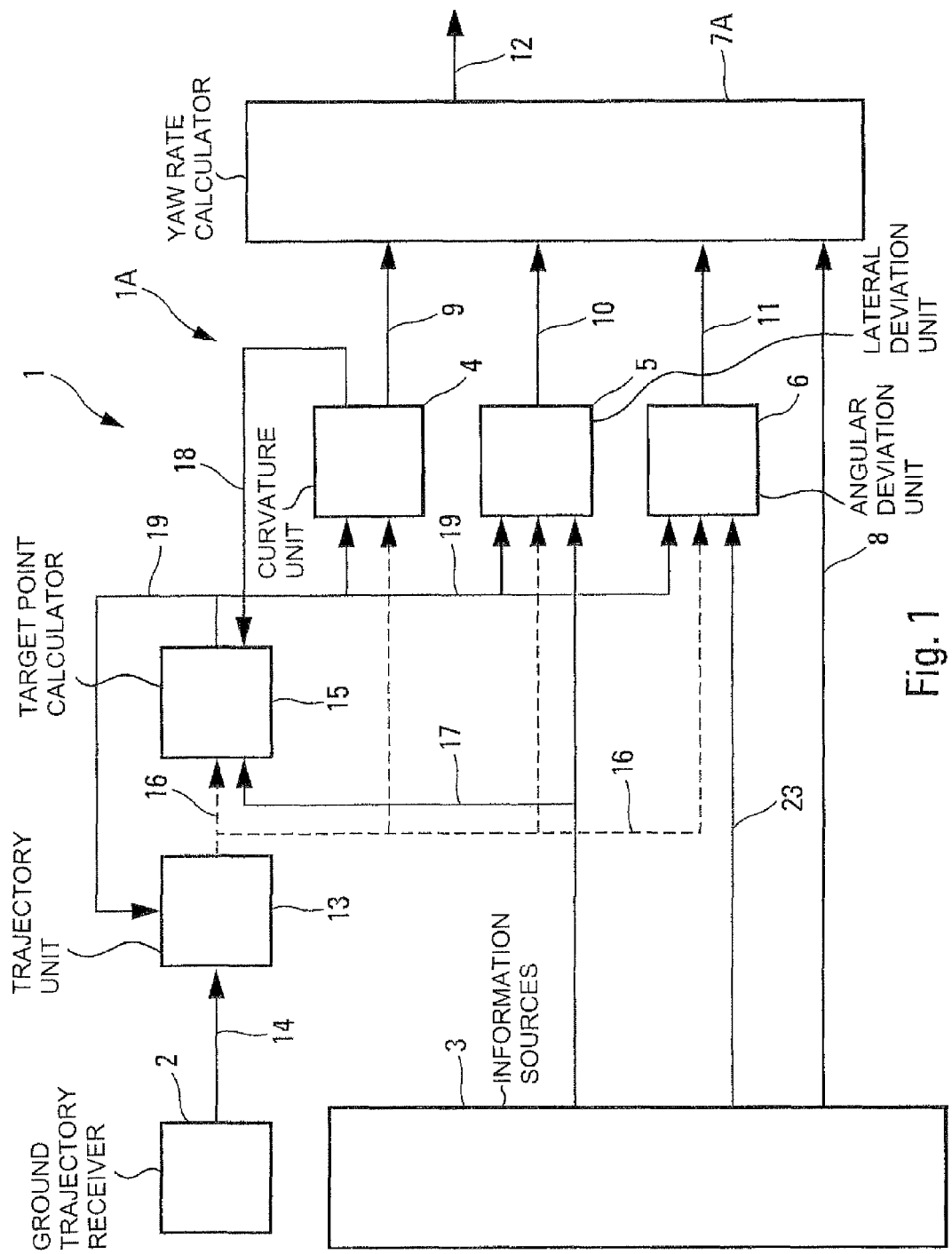
FIGS. 1 and 2 are the schematic diagrams of two different embodiments of a device in accordance with the invention for generating a yaw rate command for an aircraft rolling on the ground.
Figure 2:
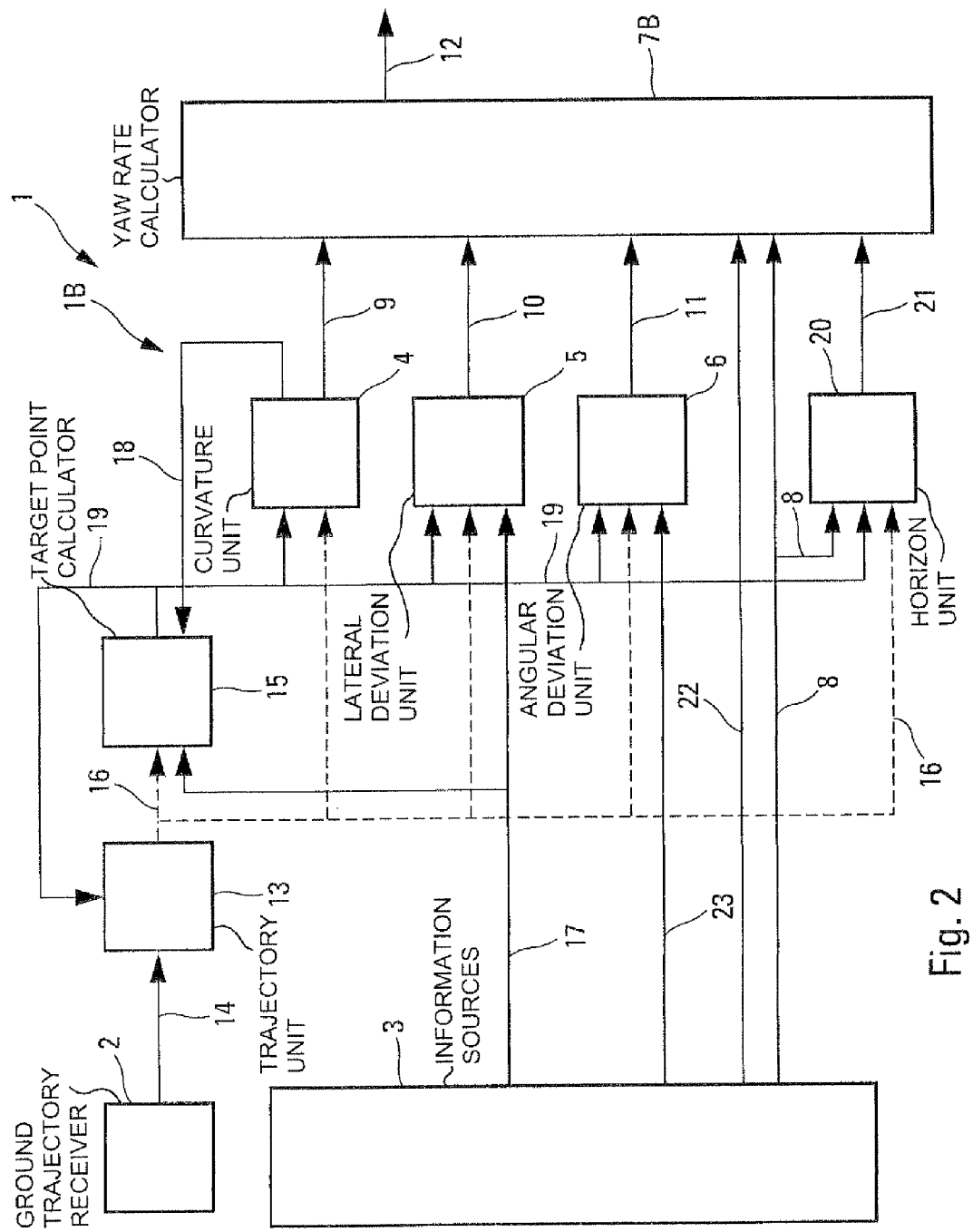
Figure 3:
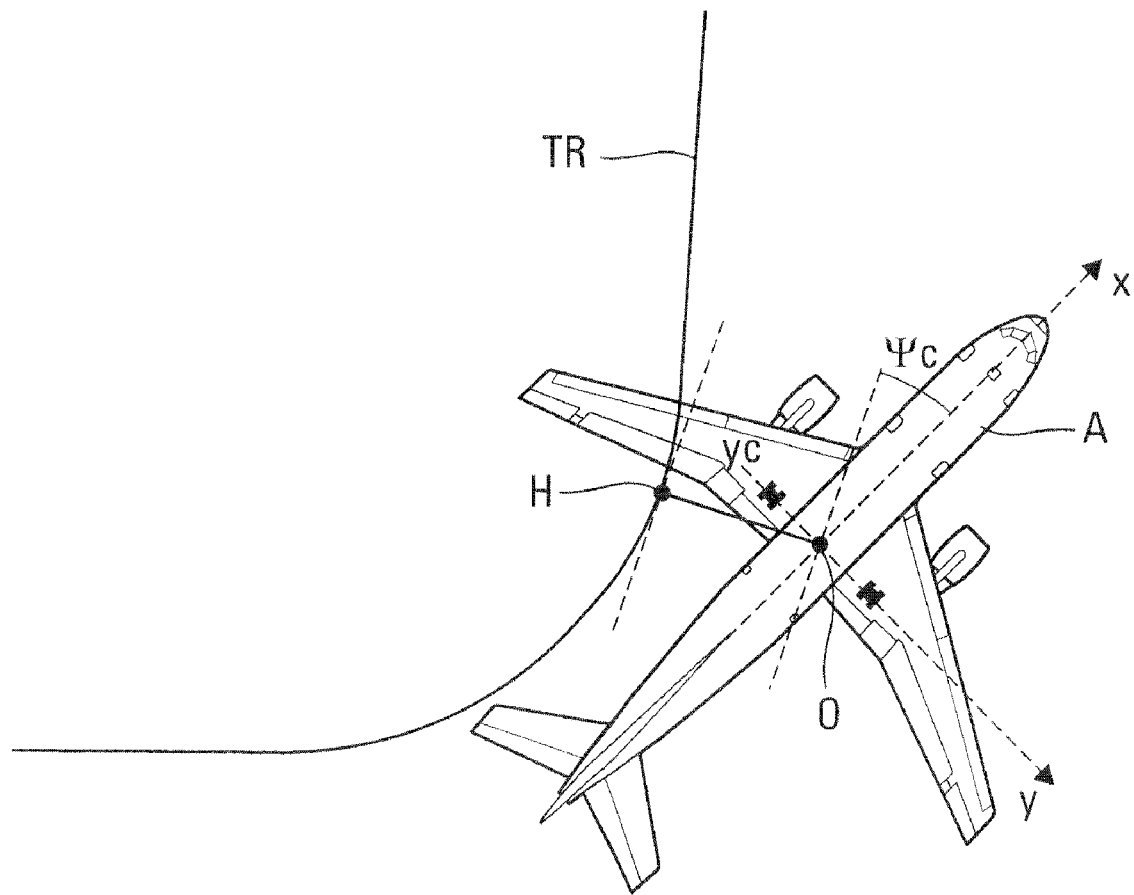
FIG. 3 schematically illustrates, in plan view, the rolling on the ground of an aircraft along a trajectory.

The device 1 in accordance with the invention and represented schematically according to two different embodiments 1A and 1B, in FIGS. 1 and 2 respectively, is intended to generate a yaw rate command for an aircraft A, in particular a transport airplane, which rolls on the ground along a ground rolling trajectory TR, as represented in FIG. 3.

The expression "ground (rolling) trajectory" designates the pathway followed by the aircraft A on an airport domain such as an airport or an aerodrome, including in particular the takeoff and landing runways, the trafficways or taxiways, the turn-around areas, the waiting zones, the stop bars, the stopping positions (stand), the maneuvering areas, and the parking areas.

It is assumed that the trajectory TR to be followed is a continuous line connecting two points of the airport domain, and can be described in mathematical form, for example in the form of a succession of straight line segments, circular or elliptic arcs, clothoids, NURBS, splines (in particular Bézier curves), or a combination of the previous curves, or any other possible description of a curve.

According to the invention, said device 1 comprises, as represented in FIGS. 1 and 2:

means 2 for receiving said ground rolling trajectory TR;

a set 3 of information sources, which comprises in particular standard means for measuring the current position, the current heading, the current lateral speed, and the current longitudinal speed of said aircraft A;

means 4 for determining, on the basis of said trajectory TR and of said measured current position, a current curvature cc at a current target point H of the trajectory TR;

means 5 for determining, on the basis of said trajectory TR and of said measured current position, a current lateral deviation yc specified below;

means 6 for determining, on the basis of said trajectory TR and of said measured current heading, a current angular deviation $\psi c$ specified below; and means 7A, 7B which are connected by way of links 8, 9, 10 and 11 respectively to said set 3, to said means 4, to said means 5 and to said means 6 and which are formed so as to calculate, on the basis of the current lateral and longitudinal speeds measured by said set 3, as well as on the basis of the current curvature cc received from said means 4, of the current lateral deviation yc received from said means 5 and of the current angular deviation $\psi c$ received from said means 6, a yaw rate which represents said yaw rate command allowing the aircraft A to follow said trajectory TR on the ground.

This trajectory TR can be provided to a user system, as specified below, by way of a link 12.

Figure 4:
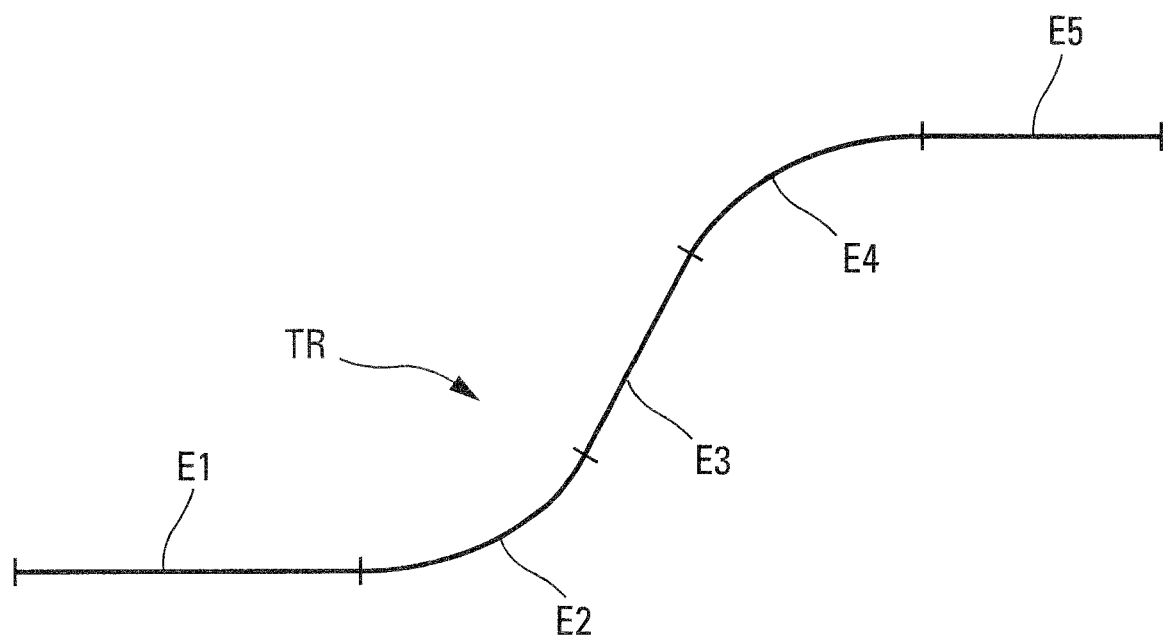
FIG. 4 schematically represents a particular example of a ground trajectory.

Furthermore, the device 1 in accordance with the invention comprises, moreover:

means 13 which are connected by way of a link 14 to said means 2 and which are intended to determine a current element Ec of the trajectory TR which comprises a plurality of successive elements E1 to E5, as represented by way of example in FIG. 4; and means 15 which are connected by way of a link 16 to said means 13, by way of a link 17 to said set 3, by way of a link 18 to said means 4 and by way of a link 19 (outgoing) to said means 13, 4, 5 and 6 (as represented in FIGS. 1 and 2) and which are formed so as to calculate, in the manner specified below, a target point H of the trajectory TR.

Said means 2, 4, 5, 6, 13 and 15 are identical in the two embodiments 1A and 1B of the device 1, represented respectively in FIGS. 1 and 2

In particular, said means 2 can comprise:

input means, in particular a keyboard, allowing an operator, in particular the pilot of the aircraft A, to input characteristics of the trajectory TR into the device 1; and/or reception means making it possible to receive automatically and directly from outside the aircraft, in particular from a post intended for the air traffic control or for the ground control, in particular with the aid of a data transmission link (not represented), information making it possible to characterize said trajectory TR.

Additionally, said means 4 which are connected by the links 16 and 19 to said means 13 and 15, determine the current curvature cc in the manner indicated below.

In the general case where the curvature is not zero at any point (the case of straight line segments), the local curvature c(s) at a point s∈[0; 1] of a parametrized plane curve Z(s) is given by the following standard relation:

$$c(s) = \frac{Z1(s)x \cdot Z2(s)y - Z19(s)y \cdot Z2(s)x}{(Z1(s)x^2 + Z1(s)y^2)^{3/2}}$$

in which:

$Z1(s)x$ and $Z1(s)y$ are the coordinates of the first derivative $Z1(s)$ of the curve $Z(s)$; and $Z2(s)x$ and $Z2(s)y$ are the coordinates of the second derivative $Z2(s)$ of the curve $Z(s)$ [that is to say of the derivative of $Z1(s)$].

In the case where the family of curves used is the family of cubic Bézier curves (according to a preferred variant embodiment), the expressions for the functions used in the above formula are given hereinafter:

$$Z1(s) = \begin{cases} Z1(s)x \\ Z1(s)y \end{cases} =$$

$$\begin{cases} 3(-Ax+Bx)(1-s)^2 + 6(-Bx+Cx)(1-s)s + 3(-Cx+Dx)s^2 \\ 3(-Ay+By)(1-s)^2 + 6(-By+Cy)(1-s)s + 3(-Cy+Dy)s^2 \end{cases}$$

$$Z2(s) = \begin{cases} Z2(s)x \\ Z2(x)y \end{cases} = \begin{cases} 6(Ax-2Bx+Cx)(1-s) + 6(Bx-2Cx+Dx)s \\ 6(Ay-2By+Cy)(1-s) + 6(By-2Cy+Dy)s \end{cases}$$

Figure 5:
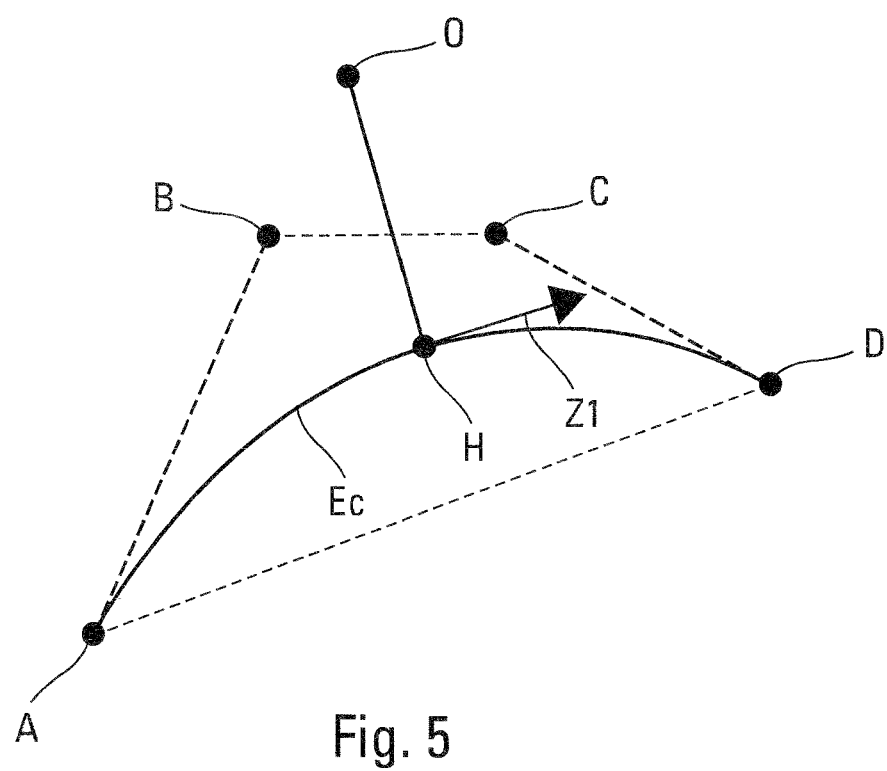
FIG. 5 is a diagram making it possible to explain the characteristics of cubic Bézier curves, used in a preferred embodiment of the invention.

A, B, C and D are the four points which define in a standard manner a cubic Bézier curve, as represented in FIG. 5, and the pairs (Ax, Ay), (Bx, By), (Cx, Cy) and (Dx, Dy) are the coordinates of these points A, B, C and D in a horizontal plane. In the subsequent description, all the parameters referenced by x or y refer to the coordinates of this plane.

Additionally, within the framework of the present invention, said means 15 intended to determine the position of the target point H on the trajectory TR can be embodied according to different variant embodiments.

A first variant embodiment corresponds to the case where the trajectory TR consists of straight line segments. The normed curvilinear abscissa sH of the target point H is given by the following relation:

$$sH = \frac{(Bx-Ax)(Ox-Ax) + (By-Ay)(Oy-Ay)}{(Bx-Ax)^2 + (By-Ay)^2}$$

where O is the point of the aircraft A that one seeks to slave, and A and B the ends of the segment forming the trajectory element considered.

The coordinates of the target point H are given by the following relation:

$$H = \begin{cases} Ax(1-sH) + BxsH \\ Ay(1-sH) + BysH \end{cases}$$

In a second variant embodiment, corresponding to the determination of the target point on an arbitrary parametrized curve, for example an NURBS curve, a spline, and in particular a Bézier curve (quadratic (order 2), cubic (order 3), or of any higher order), the means 15 are furnished with a mathematical computer (not represented) making it possible to find the roots sH of the following equation numerically:

$$Z1(sH)x(Ox-Z(sH)x)+Z1(sH)y(Oy-Z(sH)y)=0$$

with, in the case where Z(s) is a cubic Bézier curve:

$$Z(s) = \begin{cases} Z(s)x \\ Z(s)y \end{cases} = \begin{cases} Ax(1-s)^3 + 3Bx(1-s)^2s + 3Cx(1-s)s^2 + Dxs^3 \\ Ay(1-s)^3 + 3By(1-s)^2s + 3Cy(1-s)s^2 + Dys^3 \end{cases}$$

$$Z1(s) = \begin{cases} Z1(s)x \\ Z1(s)y \end{cases} =$$

$$\begin{cases} 3(-Ax+Bx)(1-s)^2 + 6(-Bx+Cx)(1-s)s + 3(-Cx+Dx)s^2 \\ 3(-Ay+By)(1-s)^2 + 6(-By+Cy)(1-s)s + 3(-Cy+Dy)s^2 \end{cases}$$

O with coordinates Ox and Oy is the control point of the aircraft A that one seeks to slave.

The real root sH lying between 0 and 1 corresponds to the current normed curvilinear abscissa and makes it possible to deduce the coordinates of the target point H by virtue of the following equation:

$$H = \begin{cases} Hx \\ Hy \end{cases} = \begin{cases} Ax(1-sH)^3 + 3Bx(1-sH)^2sH + 3Cx(1-sH)sH^2 + DxsH^3 \\ Ay(1-sH)^3 + 3By(1-sH)^2sH + 3Cy(1-sH)sH^2 + DysH^3 \end{cases}$$

In a third variant embodiment, the means 15 carry out a numerical approximation, either by searching for a minimum (gradient or Newton type for example), or by calculating the value of the lateral deviation yc for a (fixed or variable) number of values of s. The value sH corresponding to the smallest value found of the lateral deviation yc is then retained.

In a fourth variant embodiment, the means 15 use a neural net (for example, a multilayer perceptron) to determine the coordinates of the target point H by modeling the behavior of the equation of the aforesaid second variant.

In a fifth variant embodiment, the means 15 use a so-called "incremental" procedure to determine the position of the target point H, applicable to any family of curves with non-zero curvature. This procedure is as follows:

the recurrence is initialized with $$\begin{cases} t[o] = 0 \\ sH[o] = 0 \end{cases}$$

at each instant n, the following sequence is calculated:

$$R[n+1] = \begin{pmatrix} Z(sH[n])x \\ Z(sH[n])y \end{pmatrix} + \frac{1}{c[n]} \cdot \frac{\begin{pmatrix} \overrightarrow{-Z1(sH[n])y} \\ \overrightarrow{Z1(sH[n])x} \end{pmatrix}}{\left\| \begin{matrix} \overrightarrow{-Z1(sH[n])y} \\ \overrightarrow{Z1(sH[n])x} \end{matrix} \right\|}$$

$$J[n+1] = R[n+1] + \frac{1}{|c[n]|} \cdot \frac{\overrightarrow{R[n+1]O[n+1]}}{\|\overrightarrow{R[n+1]O[n+1]}\|}$$

$$\ell[n+1] = \ell[n] + \text{sign}\left(\overrightarrow{Z(sH[n])J[n+1]}.\overrightarrow{Z1(sH[n])}\right)\|\overrightarrow{Z(sH[n])J[n+1]}\|$$

$$sH[n+1] = \ell[n+1]/L$$

At each instant n, the coordinates of the target point H are then given by:

$$H(n) = \begin{cases} Ax(1-sH[n])^3 + 3Bx(1-sH[n])^2 sH[n] + 3Cx(1-sH[n])sH[n]^2 + DxsH[n]^3 \\ Ay(1-sH[n])^3 + 3By(1-sH[n])^2 sH[n] + 3Cy(1-sH[n])sH[n]^2 + DysH[n]^3 \end{cases}$$

In the above equations:
O[n] is the position of the point O of the aircraft A to be slaved at the instant n;
c[n] is the curvature at the instant n;
l[n] is the curvilinear abscissa at the instant n (computed from the start of the current curve);
sH[n] is the normed curvilinear abscissa at the instant n;
H[n] is the position of the target point H on the curve at the instant n; and
L is the total length of the current Bézier curve.

In a sixth variant embodiment, corresponding to the preferred variant, the means 15 implement a combination of the first and fifth aforesaid variants:
when the current element Ec of the trajectory TR is a straight line segment, the position of the target point H is determined by the first variant; and
in the general case (curve with nonzero curvature), the position of the target point H is determined by the fifth variant.

Additionally, if the trajectory TR is composed of several elements (or curves) E1 to E5 to be followed successively, the device 1 comprises the means 13 intended to determine the current element Ec of the trajectory TR, that is to say the element which is currently followed by the aircraft A.

In the case (representing the preferred variant embodiment) where the elements E1 to E5 of the trajectory TR are described by Bézier curves (cubic for example), said means 13 provide:
the Bézier coefficients of the current element Ec (that is to say the coordinates of the points defining the Bézier curve); and
the serial number of the current element Ec.

The switch from one trajectory element to the next is done when the following condition is fulfilled:

$$sH > 1$$

where sH is the current normed curvilinear abscissa.

Additionally, said means 5 which are connected by the links 16, 17 and 19 to the means 13, to the set 3 and to the means 15, are formed so as to calculate the lateral deviation yc between the target point H and the point O (control point of the aircraft A that one seeks to slave to the trajectory TR). The following relation gives the calculation performed by said means 5:

$$yc = -\|\overrightarrow{OH}\| \cdot \text{sign}\left[\|\overrightarrow{OH}\|x \cdot Z1(sH)y - \|\overrightarrow{OH}\|y \cdot Z1(sH)x\right]$$

where $$Z1(s) = \begin{cases} Z1(s)x \\ Z1(s)y \end{cases}$$

is the derivative of the curve Z(s) corresponding to the current element Ec of the trajectory TR, and sH is the normed curvilinear abscissa of the target point H on the curve.

Furthermore, said means 6 which are connected by the links 16, 19 and 23 to the means 13, to the means 15 and to the set 3, are formed so as to calculate the current angular deviation ψc between the current heading ψav of the aircraft A and the angle defined by the tangent of the trajectory at H. For this purpose, said means 6 use the following relation:

$$\psi c = \psi av - 2\arctan\left(\frac{Z1(sH)y}{\sqrt{Z1(sH)x^2 + Z1(sH)y^2} + Z1(sH)x}\right)$$

with ψc defined on the interval $[-\pi, \pi]$ and arctan the inverse of the tangent.

Additionally, in the first embodiment 1A of FIG. 1, said means 7A are formed so as to calculate the yaw rate command rc1 to be controlled so as to slave the point O to the trajectory TR, by using the following relation:

$$rc1 = \frac{tg(\beta1)Vx - Vy}{LRA}$$

in which:
Vg is the tangent;
Vx is the longitudinal speed of the aircraft A;
Vy is the lateral speed of the aircraft A;
LRA is the longitudinal wheelbase, that is to say the distance separating the front gear from the mid-point of the main gear; and
the quantity β1 is given by the following relation:

$$\beta1 = \arctan\left[LRA\left(\frac{\cos^3(\psi c)}{(1 - cc.yc)^2}((dcc/ds)\tan(\psi c)yc - K1(1-cc.y1)\tan(\psi c) - K2.yc + cc(1-cc.y1)\tan^2(\psi c)) + \frac{cc.\cos(\psi c)}{(1-cc.yc)}\right)\right]$$

in which:
cc is the current curvature;
yc is the current lateral deviation;
ψc is the current angular deviation; and K1 and K2 are parameters for adjusting the dynamics of the means 7A.

The control law makes it possible, specifically, to obtain a second order dynamic response in terms of lateral deviation:

$$y'' + K1y' + K2y = 0 \text{ i.e. } y'' + 2\xi\omega y' + \omega^2 y = 0$$

To adjust the gains K1 and K2, a procedure consists in adopting the standpoint of a critical regime (i.e. $\xi=1$), whence:

$$\begin{cases} K2 = \omega^2 \\ K1 = 2\sqrt{K2} \end{cases}$$

The natural angular frequency $\omega$ can be adjusted, for example, by fixing on a theoretical response distance drth (in meters), then by deducing therefrom the natural angular frequency $\omega$ with the aid of the following expression:

$$\omega = \frac{5}{drth}$$

Additionally, in the second embodiment represented in FIG. 2 and corresponding to the preferred embodiment, the device 1B implements a predictive control making it possible to anticipate the changes of curvature as well as the dynamics of the actuators. For this purpose, said device 1B comprises additional means 20 which are connected by way of links 8, 16, 19 and 21 respectively to the set 3, to the means 13, to the means 15 and to the means 7B, and which are formed so as to determine the curvature cp of the trajectory TR at a prediction horizon nH (computed in terms of number of sampling periods τ).

We will denote by:

Vx the longitudinal speed of the aircraft A;

nH the prediction horizon, computed in terms of number of sampling periods (adjustment procedure described hereinafter);

τ the sampling period of the prediction algorithm;

Lc the length of the current trajectory element Ec;

Lc+1 the length of the next trajectory element;

sH the current normed curvilinear abscissa; and sp the normed curvilinear abscissa at the prediction horizon.

sf denotes the quantity which is equal to $$sH + \frac{V_x nH\tau}{Lc}$$

If sf<1, then the predicted normed curvilinear abscissa sp equals:

$$sp = sf = sH + \frac{V_x nH\tau}{Lc}$$

Otherwise (that is to say if sf≧1), the predicted normed curvilinear abscissa sp equals:

$$sp = \left[\left(sH + \frac{V_x nH\tau}{Lc}\right) - 1\right] \cdot \frac{Lc}{Lc+1}$$

The curvature at the prediction horizon is then given by the following relation:

$$cp(sp) = \frac{Z1(sp)x Z2(sp)y - Z1(sp)y Z2(sp)x}{(Z1(sp)x^2 + Z1(sp)y^2)^{3/2}}$$

In the case where the family of curves used is the family of cubic Bézier curves (according to the preferred variant embodiment), the expressions for the functions used in the previous relation are given by:

$$Z1(sp) = \begin{cases} Z1(sp)x \\ Z1(sp)y \end{cases} =$$

$$\begin{cases} 3(-Ax + Bx)(1-sp)^2 + 6(-Bx + Cx)(1-sp)sp + 3(-Cx + Dx)sp^2 \\ 3(-Ay + By)(1-sp)^2 + 6(-By + Cy)(1-sp)sp + 3(-Cy + Dy)sp^2 \end{cases}$$

$$Z2(sp) = \begin{cases} Z2(sp)x \\ Z2(sp)y \end{cases} = \begin{cases} 6(Ax - 2Bx + Cx)(1-sp) + 6(Bx - 2Cx + Dx)sp \\ 6(Ay - 2By + Cy)(1-sp) + 6(By - 2Cy + Dy)sp \end{cases}$$

Furthermore, the means 7B calculate the yaw rate command rc2, with the aid of the following relation:

$$rc2 = \frac{\tan(\beta 2)V_x - V_y}{LRA}$$

In the expressions taken into account in this second embodiment, we have:

Vx the longitudinal speed of the aircraft A;

Vy the lateral speed of the aircraft A;

LRA the distance separating the front gear from the midpoint of the main gear;

cc the current curvature;

cp the curvature at the prediction horizon;

nH the prediction horizon;

yc the current lateral deviation;

ψc the current angular deviation;

y an adjustment parameter influencing the reactivity of the predictive control, and lying between 0 (very reactive control) and 1 (very unreactive control); and K1 and K2 parameters for adjusting the dynamics of the corrector. To determine these parameters K1 and K2, it is possible to use the same adjustment procedure as that described above in the first embodiment 1A.

Additionally, the index [n] corresponds to the present instant, the index [n+1] to the next instant, and the index [n−1] to the previous instant, etc.

Moreover, the quantity β2 is given by the value at the current instant n of the quantity β[n], through the following relation:

$$\beta 2 = \beta[n] = \left[\left[\sum_{i=0}^{nH}(\hat{\beta}_B^R(i))^2\right]^{-1}\sum_{i=0}^{nH}(d(n+i)\hat{\beta}_B^R(i))\right] + \beta l[n]$$

with:

$$\beta l[n] = \arctan\left(\frac{v}{1+uv+u^2}\right)$$

$$u = \frac{LRA.cc.\cos(\psi c)}{(1-cc.yc)}$$

-continued $$v = \frac{LRA.\cos^3(\psi c)}{(1-cc.yc)^2}((dcc/ds)\tan(\psi c)yc - $$

$$K1(1-cc.yc)\tan(\psi c) - K2.yc + cc(1-cc.yc)\tan^2(\psi c))$$

$$\hat{\beta}_B^R(i) = \sum_{j=0}^{i} C.F^{i-j}.K, \text{ where } C = [1 0 0], F = \begin{bmatrix} b1 & b2 & a2 \\ 1 & 0 & 0 \\ 0 & 0 & 0 \end{bmatrix} \text{ and }$$

$$K = \begin{bmatrix} a1 \\ 0 \\ 1 \end{bmatrix}, \text{ and where } a1,$$

a2, b1 and b2 are the coefficients of the following second order discrete transfer function, representing the yaw dynamics of the aircraft A:

$$T(z^{-1}) = \frac{a1z^{-1} + a2z^{-2}}{1 + b1z^{-1} - b2z^{-2}}$$

A possible procedure making it possible to find the coefficients a1, a2, b1 and b2 consists in identifying in discrete (for example with the aid of a model ARX) the yaw rate response of the aircraft to a step change in yaw rate, for a mean operating point, and the sampling period of the algorithm;

$$d(n+i) = \arctan[LRA.cp](1-y^i) +$$

$$y^i(\beta_{[n]}^M - \beta l[n]) - C.F^i \cdot \begin{pmatrix} \beta_{[n]}^M - \beta l[n] \\ \beta_{[n-1]}^M - \beta l[n] \\ \beta[n-1] \end{pmatrix}$$

where $$\beta_{[n]}^M = \arctan\left(\frac{rM.LRA + Vy}{Vx}\right); \text{ and}$$

rM is the measured yaw rate.

A possible procedure for adjusting the value of the prediction horizon nH consists in choosing an initial value of nH such that the quantity nH·τ is about equal to the response time of the yaw rate dynamics, and then adjusting the prediction horizon empirically during trials, so as to obtain the desired response in terms of lateral deviation.

Consequently:
in the aforesaid first embodiment, the device 1 comprises means 7A making it possible to calculate a yaw rate command rc1 on the basis of:
the curvature cc of the trajectory TR at the level of the target point H;
the lateral deviation yc between the target point H and the point O of the aircraft A to be slaved;
the angular deviation ψc between the longitudinal axis of the aircraft A and the straight line tangent to the trajectory TR at the level of the target point H; and
the longitudinal speed Vx and the lateral speed Vy of the aircraft A with respect to the ground.
The calculation of the curvature and of the lateral and angular deviations require the determination of the position of the target point H, expressed in the form of a normed curvilinear abscissa; and
in the second embodiment, corresponding to the preferred embodiment, the device 1 comprises more complete means 7B, which use the dynamics of the actuator which controls the orientation of the wheel of the front gear, as well as the knowledge of the curvature of the trajectory at a given time horizon, termed the prediction horizon. In this case, the means 7B require an additional calculation making it possible to determine the curvature at the prediction horizon, implemented by the means 20, and the structure of the means 7B is modified (with respect to the means 7A) with a view to carrying out the predictive control. This second embodiment presents the advantage of being more accurate than the first embodiment in terms of maximum lateral deviation measured along a trajectory TR.

In a preferred application, said device 1 forms part of a system 24 which is intended for the automatic lateral guidance of the aircraft A rolling on the ground.

Figure 6:
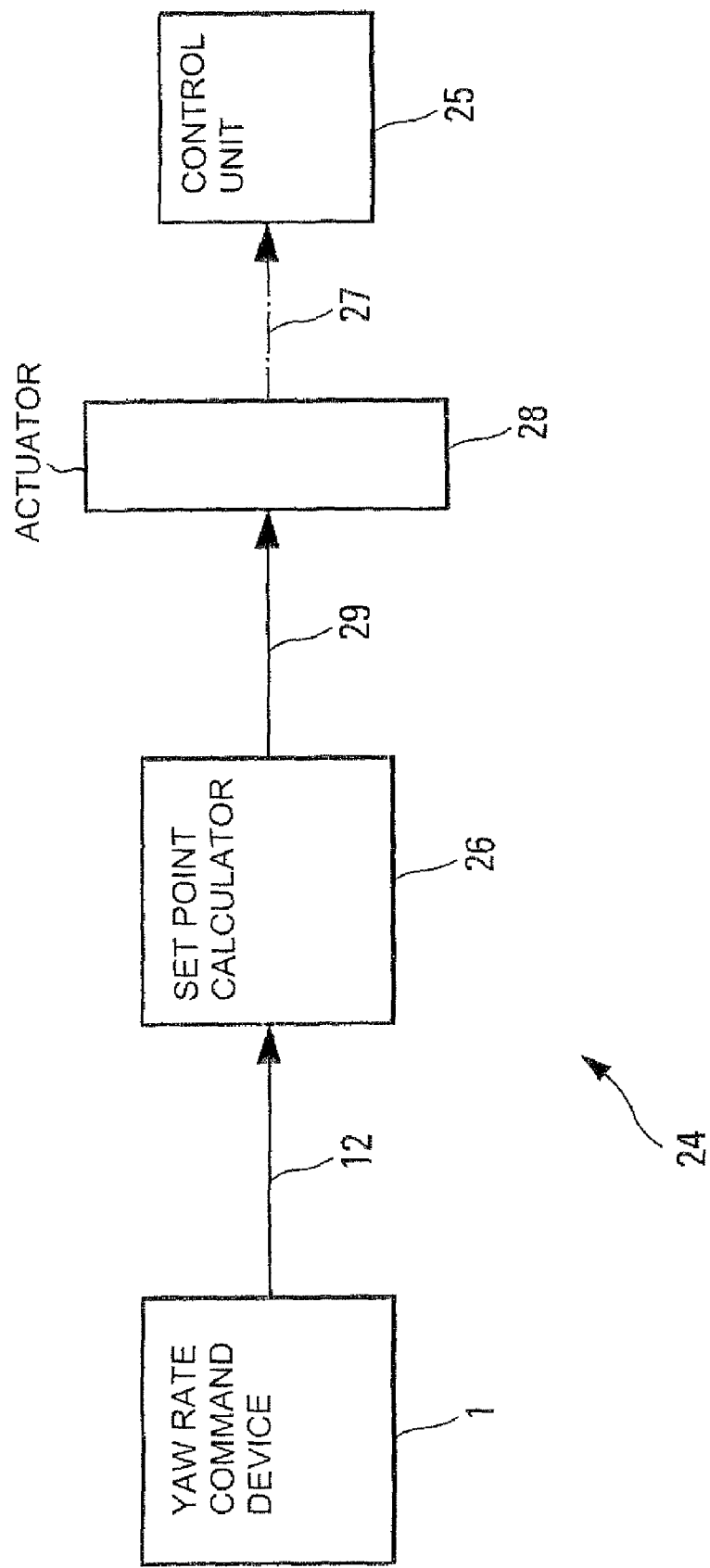
FIG. 6 is the schematic diagram of a system for the automatic lateral guidance of an aircraft, which comprises a device in accordance with the invention.

As represented in FIG. 6, this system 24 comprises, in addition to said device 1 (which is embodied according to either one of the embodiments 1A and 1B):
control means 25 which act on the yaw motion of the aircraft. These means 25 can comprise, in particular, the wheel of the front landing gear of the aircraft A, standard means for controlling the thrust of the engines, the brakes of the aircraft A, and/or a rudder;
means 26 which are connected by way of the link 12 to said device 1 and which are intended to calculate setpoints able to be applied to said control means 25. These setpoints are such that applied to said control means 25, the latter control the aircraft A according to the yaw rate command received from said device 1 through the link 12; and
standard means 28, for example actuators of the rudder, which are connected by way of a link 29 to said means 26 and which are formed so as to apply, in a standard manner, the setpoints calculated by said means 26 to said control means 25, as illustrated by a chain-dotted link 27.

The system 24 in accordance with the invention makes it possible, in particular:
to reduce the pilot's workload in the course of a phase of movement of the aircraft A, by handling the lateral guidance of the latter. Thus, the pilot can concentrate on other tasks, in particular the speed of the aircraft, monitoring the exterior environment (movement of other vehicles, surrounding obstacles), communication with the air/ground traffic control, etc.;
to guarantee the position of the aircraft A with respect to the axis of a runway, trafficway or any other element of the airport domain, through which said ground rolling trajectory TR passes;
to guarantee the guidance of the aircraft A, whose relative length in relation to the dimensions of the trafficways may pose difficulties (such as the risk of wheels departing from the pavement), without requiring any additional device intended to aid the pilot (such as an exterior camera for example); and
to authorize the circulation of the aircraft A under visibility conditions which render the guidance action difficult, doing so without the use of an exterior aid such as a vehicle to be followed for example.

The invention claimed is:
1. A method of generating a yaw rate command for an aircraft along a ground trajectory, comprising the steps of:
a) measuring current position, current heading, current lateral speed, and current longitudinal speed of said aircraft;

b) determining, by a curvature unit, a current curvature at a current target point of the trajectory on the basis of said trajectory and said measured current position;

c) determining, by a lateral deviation unit, a current lateral deviation (yc) on the basis of said trajectory and said measured current position;

d) determining, by an angular deviation unit, a current angular deviation (ψc) on the basis of said trajectory and said measured current heading; and e) calculating, by a yaw rate calculator, a yaw rate which represents said yaw rate command for the aircraft to follow said trajectory on the basis of said measured current lateral and longitudinal speeds, and on the basis of said determined current curvature, current lateral deviation (yc) and current angular deviation (ψc), wherein in step e), said yaw rate command rc is calculated by said yaw rate calculator according to the following expression:

$$rc=(tg\beta \cdot Vx-Vy)/LRA$$

in which:

Vx is the measured current longitudinal speed of the aircraft;

Vy is the measured current lateral speed of the aircraft;

LRA is a parameter illustrating the longitudinal wheelbase of the aircraft; and

β is an angular parameter.

2. The method as claimed in claim 1,
wherein in step b):
a current element of said trajectory, said current element comprising a series of successive elements, is determined, by a trajectory unit, on the basis of said trajectory and said measured current position;
the current target point is determined based on the determined current element, a control point of the aircraft and said current position; and
the current curvature is determined based on the determined current target point.

3. The method as claimed in claim 1,
wherein in step c), said current lateral deviation (yc) is determined based on distance between a control point of the aircraft and the current target point of the trajectory.

4. The method as claimed in claim 1,
wherein in step d), said current angular deviation (ψc) is determined based on angular deviation between the current heading of the aircraft and a tangent to the trajectory at the current target point.

5. The method as claimed in claim 1,
wherein said parameter β is based on the current curvature, the current lateral deviation (yc), and the current angular deviation (ψc).

6. The method as claimed in claim 1,
wherein:
in step a), a current yaw rate of the aircraft is measured;
a predicted curvature is determined on the basis of said trajectory and said measured current position of the aircraft; and said parameter β is calculated on the basis of the determined current curvature, current lateral deviation (yc), current angular deviation (ψc), the current yaw rate, and predicted curvature.

7. The method as claimed in claim 6,
wherein said predicted curvature corresponds to a curvature of trajectory at a predetermined distance from the current position of the aircraft.

8. A procedure for automatic lateral guidance of an aircraft along a ground trajectory, comprising the steps of:

A/ generating a yaw rate command according to the method of claim 1;
wherein:
B/ setpoints are calculated by a set point calculator and applied to a control unit to pilot the aircraft laterally according to said yaw rate command.

9. A yaw rate command device that generates a yaw rate command for an aircraft along a ground trajectory, said device comprising:

ground trajectory receiver that receives said ground trajectory;

information sources that measure current position, current heading, current lateral speed, and current longitudinal speed of said aircraft;

curvature unit that determines, on the basis of said trajectory and said measured current position, a current curvature at a current target point of the trajectory;

lateral deviation unit that determines on the basis of said trajectory and said measured current position, a current lateral deviation (yc);

angular deviation unit that determines, on the basis of said trajectory and said measured current heading, a current angular deviation (ψc); and yaw rate calculator that determines, on the basis of said measured current lateral and longitudinal speeds, and on the basis of said current curvature, current lateral deviation (yc) and current angular deviation (ψc), a yaw rate which represents said yaw rate command for the aircraft to follow said trajectory, wherein said yaw rate calculator calculates said yaw rate command rc according to the following expression:

$$rc=(tg\beta \cdot Vx-Vy)/LRA$$

in which:

Vx is the measured current longitudinal speed of the aircraft;

Vy is the measured current lateral speed of the aircraft;

LRA is a parameter illustrating the longitudinal wheelbase of the aircraft; and

β is an angular parameter.

10. A lateral guidance system that laterally guides an aircraft along a ground trajectory, the system comprising:

the yaw rate command device of claim 9;
control unit that acts on yaw motion of the aircraft;
set point calculator that calculates setpoints based on said yaw rate command generated by the yaw rate command device; and
actuator that applies the calculated setpoints to said control unit.

* * * * *